(12) United States Patent
Le Meur et al.

(10) Patent No.: US 8,094,945 B2
(45) Date of Patent: Jan. 10, 2012

(54) METHOD FOR ASSESSING IMAGE QUALITY

(75) Inventors: Olivier Le Meur, Talensac (FR);
Patrick Le Callet, Le Pallet (FR);
Dominique Barba, Carquefou (FR)

(73) Assignee: Thomson Licensing,
Boulogne-Billancourt (FR)

( * ) Notice: Subject to any disclaimer, the term of this patent is extended or adjusted under 35 U.S.C. 154(b) by 1090 days.

(21) Appl. No.: 11/920,457

(22) PCT Filed: May 5, 2006

(86) PCT No.: PCT/EP2006/062103
§ 371 (c)(1),
(2), (4) Date: Nov. 15, 2007

(87) PCT Pub. No.: WO2006/125721
PCT Pub. Date: Nov. 30, 2006

(65) Prior Publication Data
US 2009/0103813 A1 Apr. 23, 2009

(30) Foreign Application Priority Data
May 25, 2005 (EP) ...................... 05291126

(51) Int. Cl.
*G06K 9/48* (2006.01)
(52) U.S. Cl. ........ 382/199; 382/100; 382/209; 382/254; 382/276
(58) Field of Classification Search .................. 382/100, 382/199, 209, 254, 276
See application file for complete search history.

(56) References Cited

U.S. PATENT DOCUMENTS

| | | | | |
|---|---|---|---|---|
| 6,658,280 B1 * | 12/2003 | Haacke | .......................... | 600/410 |
| 7,428,343 B2 * | 9/2008 | Jung | .............................. | 382/254 |
| 7,508,995 B2 * | 3/2009 | Schmidt | ........................ | 382/276 |
| 7,593,586 B2 * | 9/2009 | Haven et al. | ................... | 382/254 |
| 7,676,101 B2 * | 3/2010 | Sato et al. | ..................... | 382/238 |
| 7,769,243 B2 * | 8/2010 | Shimizu | ........................ | 382/275 |
| 2003/0210822 A1 * | 11/2003 | Endo | ............................ | 382/291 |

FOREIGN PATENT DOCUMENTS
EP 1017019 7/2000

OTHER PUBLICATIONS

K. T. Tan: "An objective measurement tool for MPEG video quality—An analysis of decisions under risk", Signal Processing, Elsevier Science Publishers B.V. Amsterdam, NL, vol. 70, No. 3, Nov. 30, 1998, pp. 279.294.

(Continued)

*Primary Examiner* — Stephen Koziol
(74) *Attorney, Agent, or Firm* — Tutunjian & Bitetto, P.C.

(57) ABSTRACT

The invention is a method for assessing image quality value of a distorted image with respect to a reference image. The method comprises the following steps:
  computing, for each pixel of the distorted image, at least one quality level with respect to the reference image;
  adding, for the distorted image, the quality levels associated to each pixel by weighting them by a weight depending on a perceptual interest of the pixel in order to get the image quality value, the weight being lower for a pixel of high perceptual interest.

6 Claims, 2 Drawing Sheets

OTHER PUBLICATIONS

M. Carnec et al: "An image quality assessment method based on perception of structural information" Proceedings 2003 International Conference on Image Processing. ICIP-2003, Barcelona, Spain. Sep. 14-17, 2003, IEEE US, vol. vol 2 of 3, pp. 185-188.

O. Le Meur et al: "From low-level perception to high-level perception: a coherent approach for visual attention modeling" Proceedings of the SPIE—The Int'l Society for Optical Engineering SPIE-Int. vol. 5292, No. 1, 2004, paces 284-285.

R.D. Zampolo et al: A measure for perceptual image quality assessment Proceedings 2003 Int'l Conf. on Image Processing, ICIP-2003. Barcelona, Spain, Sep. 14-17, 2003, IEEE, US, vol. 2 of 3, pp. 433-436.

Juan Du et al: "A new blind image quality assessment based on HVS" The 8th World Multi-Conference on Systemics, Cybernetics and Informatics IIIS Orlando, FL. USA, vol. 6, 2004, pp. 361-365.

Yongoing Zeng: "Perceptual segmentation algorithm and Its application to image coding" Image Processing, 1999, ICIP 99. Proceedings 1999 Int'l Conference on Kobe, Japan Oct. 24-28, 1999, vol. 2, Oct. 24, 1999, pp. 820-824.

Search Report Dated Jul. 7, 2006.

* cited by examiner

FIG.1 – State of art
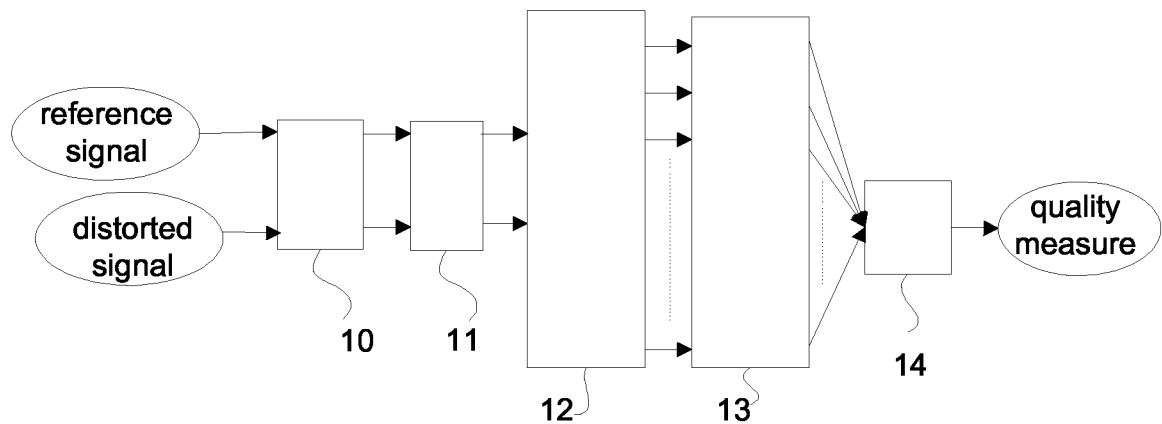
FIG.2
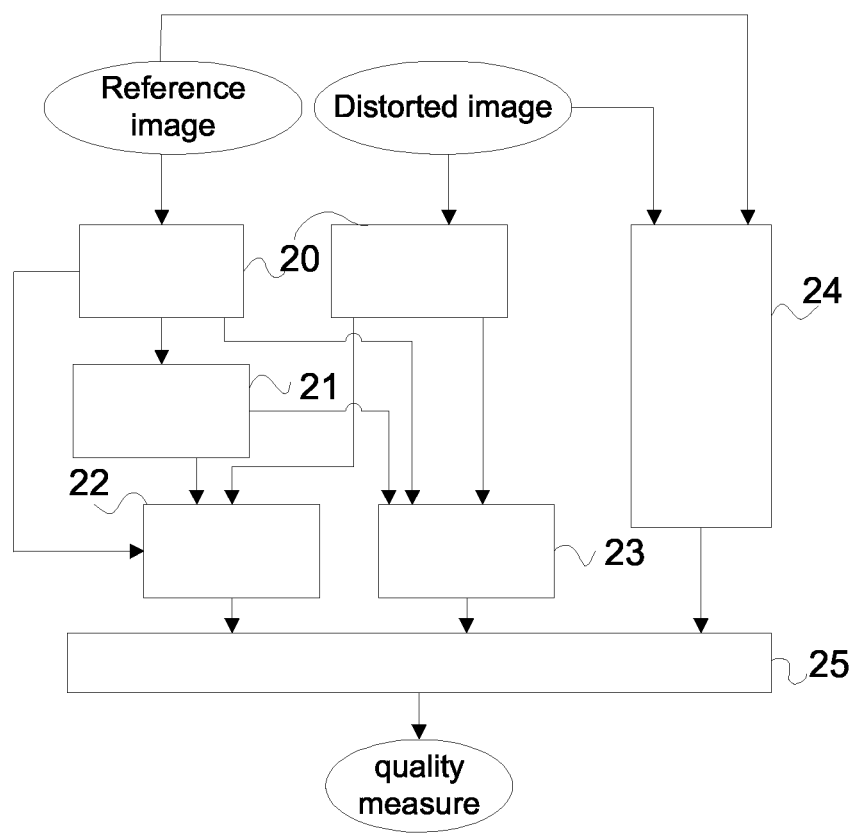

| -1 | 0 | +1 |
|----|---|----|
| -2 | 0 | +2 |
| -1 | 0 | +1 |

$\underbrace{\qquad\qquad}_{30}$

| +1 | +2 | +1 |
|----|----|----|
| 0  | 0  | 0  |
| -1 | -2 | -1 |

$\underbrace{\qquad\qquad}_{31}$

{}# METHOD FOR ASSESSING IMAGE QUALITY

This application claims the benefit, under 35 U.S.C. §365 of International Application PCT/EP2006/062103, filed May 5, 2006, which was published in accordance with PCT Article 21(2) on Nov. 30, 2006 in English and which claims the benefit of European patent application No. 05291126.0, filed May 25, 2005

1. FIELD OF THE INVENTION

The invention concerns a method for assessing the image quality of a distorted image (e.g. after encoding/decoding) with respect to a reference image. More particularly, the invention is a method that automatically assesses such a quality.

2. BACKGROUND OF THE INVENTION

Objective methods for assessing perceptual image quality commonly examine the visibility of the errors. An error is the difference between a distorted image and a reference image. Bearing in mind a variety of known properties of the human visual system, an objective quality metric is able to give a relevant quality value regarding the ground truth. Classical methods used to assess the quality of a distorted signal with respect to a reference signal comprise the following steps depicted on FIG. 1:

- A preprocessing step 10: this step consists, for example, in applying a Gamma law on the reference and distorted images to eliminate non linearities of displays;
- A contrast sensitivity function (CSF) filtering step 11: CSF deals with the fact that a viewer is not able to perceive all the details in his visual field with the same accuracy; for example, his sensitivity is higher for the horizontal and vertical structures.
- a channel decomposition 12 step: in order to simulate the different populations of visual cells (cones, ... ), images are decomposed into several subbands; each subband may be regarded as the neural image generated by a particular population of visual cells tuned to both a particular orientation and a particular frequency.
- An error normalization and masking step 13: these steps deal with the modulation of the sensitivity of the eyes regarding the content of the image; for example, a coding artifact is more visible in a flat region (featured by a weak masking capability) than in a highly textured region (featured by a strong masking capability).
- An error pooling step (14): such a step combines the error signals coming from different modalities into a single quality/distortion value.

These approaches have a high computational complexity. Furthermore it is difficult to embed such algorithms in a video coding scheme.

3. SUMMARY OF THE INVENTION

The invention concerns a method for assessing image quality value of a distorted image with respect to a reference image, each image comprising pixels or image points. It comprises the following steps:

- computing, for each pixel of the distorted image, at least one quality level with respect to the reference image;
- adding, for the distorted image, the quality levels associated with each pixel by weighting them by a weight depending on a perceptual interest of the pixel in order to get the image quality value, the weight being lower for a pixel of high perceptual interest.

Advantageously, the computation step computes at least two quality levels for each pixel of the distorted image and is followed by a step for multiplying, for each pixel of the distorted image, the at least two quality levels in order to get one quality level for each pixel of the distorted image. Preferentially, the weights are derived from saliency maps.

Advantageously, the computation step consists in one or more of the following steps:

- computing a first quality level based on edge suppression level; and/or
- computing a second quality level based on edge apparition level; and/or
- computing a third quality level based on blocking effect level.

Preferentially, the adding step uses the Minkowsky metric.

According to an exemplary embodiment the computation step is preceded by the following steps:

- detecting edges on the reference and distorted images, this step generating two edge images, an edge strength value (edgeSrc(i,j)) being associated to each pixel of coordinates (i,j) in the reference image and an edge strength value (edgeDeg(i,j)) being associated to each pixel of coordinates (i,j) in the distorted image;
- thresholding the edge images, this step generating two edge maps, each map identifying edge pixels;
- dividing the reference image into non-overlapping blocks;
- estimating the level of texture for each block of the reference image by computing the number of edge pixels within each block and associate this value to each pixel within the block; and
- computing the masking capability (Mask(i,j)) of each pixel of coordinates (i,j) in the reference image based on the estimated levels of texture;

Preferentially, the first quality level is computed for a pixel of coordinates (i,j) in the distorted image with the following formula:

$$Qsupp(i, j) = 2\frac{edgeSrc(i, j) \times \mathrm{MIN}[edgeScr(i, j), Mask(i, j) \times edgeDeg(i, j)]}{edgeSrc(i, j)^2 + \mathrm{MIN}[edgeSrc(i, j), Mask(i, j) \times edgeDeg(i, j)]^2}$$

wherein:

- edgeSrc(i,j) is the edge strength value associated to the pixel of coordinates (i,j) in the reference image;
- edgeDeg(i,j) is the edge strength value associated to the pixel of coordinates (i,j) in the distorted image;
- Mask(i,j) is the masking capability of the pixel of coordinates (i,j) in the reference image; and
- MIN is the function that gives the minimum of two values.

Preferentially, the second quality level is computed for a pixel of coordinates (i,j) in the distorted image with the following formula:

$$Qadd(i, j) = 1 - \frac{\mathrm{MAX}[edgeDeg(i, j) - edgeSrc(i, j), 0] \times \mathrm{Mask}(i, j)}{edgeSrc(i, j)}$$

wherein:

- edgeSrc(i,j) is the edge strength value associated to the pixel of coordinates (i,j) in the reference image;
- edgeDeg(i,j) is the edge strength value associated to the pixel of coordinates (i,j) in the distorted image;
- Mask(i,j) is the masking capability of the pixel of coordinates (i,j) in the reference image; and
- MAX is the function that gives the maximum of two values.

Preferentially, the third quality level is calculated for a pixel of the distorted image by the following steps:
- dividing the reference and distorted images into non overlapping blocks defined by their spatial location, a block of the distorted image whose spatial location is the same as the spatial location of a block of the reference image being named corresponding block;
- computing for each block in the images four gradient values based on four neighboring blocks;
- subtracting from each gradient value associated with each block of the reference image the corresponding gradient value associated with the corresponding block of the distorted image, the subtracted values being associated with each block of the distorted image;
- combining, for each block of the distorted image, the subtracted values to get a combined gradient value per block; and
- computing the third quality level for each block as an inverse function of the combined gradient value and assign the third quality level to each pixel within the block.

4. DRAWINGS

Other features and advantages of the invention will appear with the following description of some of its embodiments, this description being made in connection with the drawings in which:

FIG. 1 depicts a method for assessing the quality of a distorted signal compared to a reference signal according to state of the art;

FIG. 2 depicts the flowchart of the method according to the invention;

5. DETAILED DESCRIPTION OF THE INVENTION

Figures 3, 4:
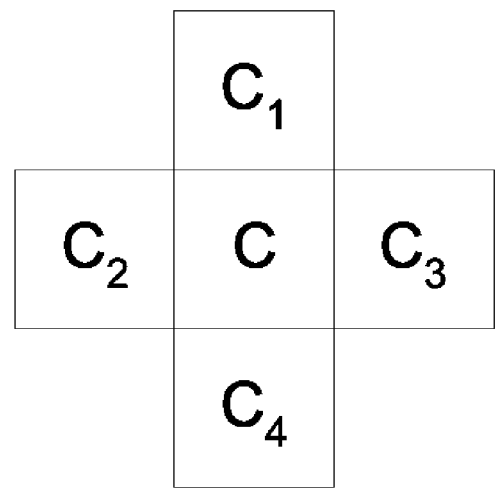
FIG. 3 depicts Sobel masks used to extract edges in an image.
FIG. 4 depicts a block and four neighboring blocks surrounding it.

The invention consists in automatically computing a value for assessing image quality of a distorted image with respect to a reference image, both images having a width of W pixels and a height of H pixels. To each pixel (respectively each block) in the distorted image corresponds a pixel (respectively a block) in the reference image, named corresponding pixel (respectively corresponding block), whose spatial location in the reference image is the same as the spatial location of the pixel (respectively block) in the distorted image. The proposed method is less complex than the classical method from a computational point of view while being more efficient. FIG. 2 describes the method according to the invention. In this figure, the represented boxes are purely functional entities, which do not necessarily correspond to physical separated entities. Namely, they could be developed in the form of software or be implemented in one or several integrated circuits. The invention consists in computing at least one quality level. In the exemplary embodiment three quality levels are computed (steps 22, 23, and 24) based on three error signal levels named hereinafter edges suppression level, false edges level, and blocking effect level.

A first preliminary step 20 consists in detecting the edges in the reference and the distorted images. Indeed, the different structures of the image content consist of a large amount of edges. The detection of these edges on both the reference and the distorted images and the comparison of the detected edges is a way to detect a degradation of the structural information. The Sobel operator is used to detect them. It performs a 2-D spatial gradient measurement on an image. It uses a pair of 3×3 convolution masks, one estimating the gradient Gx gradient in the x-direction (columns) and the other estimating the gradient Gy in the y-direction (rows). Such an operator is depicted on FIG. 3. The left mask 30 is used to detect the gradient in the x-direction while the right mask 31 is used to detect the gradient in the y-direction. The gradient magnitude (also named edge strength) is approximated for each pixel by the following formula: $G=\sqrt{Gx^2+Gy^2}$. Two edge images are thus generated, a gradient magnitude value being associated to each pixel within these two images. Edge maps are then generated by thresholding these edge images. An edge map is an image that associates to each pixel of coordinates (i,j) a value A or a value B. Such a map is obtained by comparing for each pixel the edge strength associated to it with a predefined threshold. If the edge strength is higher than the threshold then a value A is associated to it, if not then a value B is associated to it. The pixels with a value A associated to them are named edge pixels. Edge maps, called respectively edgeSrc and edgeDeg, are thus computed for the reference and for the distorted picture.

A second preliminary step 21 consists in estimating the level of texture within the reference image. To this aim, the edge map edgeSrc is divided into non-overlapping blocks. The number of edge pixels imgTexture contained in each block is counted. For each block, this number is then associated to each pixel located within the block in order to generate a texture image that associates to a pixel of coordinates (i,j) a value imgTexture(i,j). In practice, a 16 by 16 pixels block is used. Indeed many video compression standards use a macroblock, i.e. a 16 by 16 pixels blocks, as a basic unit (e.g. for motion estimation). Textured regions can be coded coarsely, i.e. with a higher quantization step than flat regions, since coding artifacts are less visible in textured regions. Indeed the visual masking capability of such areas is more important. The texture information imgTexture(i,j) previously computed for each block and associated to each pixel is used to compute a map named Mask representing the visual masking capability of a pixel (i,j) in the reference image:

$$\text{Mask}(i, j) = 1 - \frac{1}{\alpha + \exp(\beta - imgTexture(i, j))}$$

Each value Mask(i,j) is deduced from a sigmoid function that ranges from 0 to 1. If Mask(i,j)=1 then the capability of the visual masking is null for the pixel of coordinates (i,j). $\alpha$ and $\beta$ are for example set to 12 and 100, respectively.

A first quality level computation step, referenced 22, consists in computing, for each pixel of the distorted image, a first quality level Qsupp based on edges suppression level. In the context of video encoding the suppression of edges is inherently due to a quantification of the images. This suppression can be very annoying in certain regions of an image, especially in near flat regions. Qsupp is computed, for each pixel, by the following equation:

$$Qsupp(i, j) = 2 \frac{edgeSrc(i, j) \times \text{MIN}[dgeSrc(i, j), \text{Mask}(i, j) \times edgeDeg(i, j)]}{edgeSrc(i, j)^2 + \text{MIN}[edgeSrc(i, j), \text{Mask}(i, j) \times edgeDeg(i, j)]^2}$$

A second quality level computation step, referenced 23, consists in computing, for each pixel of the distorted image, a second quality level Qadd based on false edges (also named false contours) level. Qadd is computed, for each pixel, as below:

$$Qadd(i, j) = 1 - \frac{add(i, j) \times Mask(i, j)}{edgeSrc(i, j)}$$

where, add(i,j)=MAX[edgeDeg(i,j)–edgeSrc(i,j),0]. When the number of false edges increases (especially when the masking value is high), the quality decreases in function of the total number of edges contained in the reference regions.

A third quality level computation step, referenced 24, consists in computing, for each pixel of the distorted image, a third quality level based on blocking effect level. The reference and the distorted images are first divided into non overlapping blocks of size M by M pixels (e.g. M=8 or M=16). The size of these blocks may be different from the size of the blocks used at step 21. For each block in each image, four gradient values Grad_x_H0, Grad_x_H1, Grad_x_V0, Grad_x_V1 where x refers either to the reference (x=ref) or the distorted image (x=dist) are computed with respect to four neighboring blocks, referenced $C_1$, $C_2$, $C_3$, and $C_4$ on FIG. 4, surrounding the current block, referenced C on FIG. 4, according to the following formulas:

$$Grad\_x\_H0 = \sum_{k=0}^{M-1} |p(i_0 + k, j_0) - p(i_0 + k, j_0 - 1)|$$

$$Grad\_x\_H1 = \sum_{k=0}^{M-1} |p(i_0 + k, j_0 + M - 1) - p(i_0 + k, j_0 + M)|$$

$$Grad\_x\_V0 = \sum_{k=0}^{M-1} |p(i_0, j_0 + k) - p(i_0 - 1, j_0 + k)|$$

$$Grad\_x\_V1 = \sum_{k=0}^{M-1} |p(i_0 + M - 1, j_0 + k) - p(i_0 + M, j_0 + k)|$$

where:
p(i,j) represents the luminance value associated to the pixel of coordinates (i,j) in either the reference (x=ref) or the distorted image (x=dist);
($i_0$, $j_0$) represents the coordinates of the pixel located in the upper left corner of the block for which gradient values are computed. The final estimation consists in computing for each block a first value called Q1_BLOCK that is assigned to each pixel (i,j) within the block as follows: Q1_BLOCK(i, j)=$f$(Grad_ref_H0_Grad_dist_H0, Grad_ref_H1_Grad_dist_H1, Grad_ref_V0-Grad_dist_V0, Grad_ref_V1-Grad_dist_V1) where the function $f$ can be for example the average function or the maximum function. Q1_BLOCK is computed by subtracting from each gradient value associated with each block of the reference image the corresponding gradient value associated with the corresponding block of the distorted image. For example, Q1_BLOCK is associated to each corresponding block in the distorted image. It may also be associated to each block in the reference image. Finally, the third quality level QBLOCK is computed for each pixel of the distorted image as an inverse function of Q1_BLOCK. For example, it is computed using the sigmoid function as follows:

$$QBLOCK(i, j) = \frac{1}{1 + \exp\left(\frac{Q1\_BLOCK(i, j)}{T}\right)}$$

where T is a threshold that is experimentally defined and that may depend on the masking capability of the region the pixel belong to. Indeed a blocking effect is more visible in a near flat region than in a highly textured region.

The last step 25, called modified error pooling step, consists in computing a single image quality value $\overline{D}$. The first sub-step thus consists in combining for each pixel of the distorted image the various quality levels (i.e. Qsupp(i,j), Qadd(i,j), et QBLOCK(i,j)) into a single quality level D(i,j):

$$D(i, j) = \prod_{k=0}^{2} (param(i, j; k)),$$

where:
param(i,j; 0) refers here to the degradation caused by the edge suppression Qsupp(i,j);
param(i,j; 1) refers here to the degradation caused by the false edges Qadd(i,j);
param(i,j; 2) refers here to the degradation caused by the blocking effects QBLOCK(i,j).

If according to another embodiment, only one quality level for each pixel of the distorted image has been computed, the first sub-step can be avoided. The second sub-step consists in deriving a single image quality value $\overline{D}$ based on the perceptual interest of each pixel of the reference image. In fact, a perceptible distortion is more annoying in a region of perceptual interest than in the other regions. In this case, the quality levels associated to each pixel are further combined into a single image quality value $\overline{D}$ using a weighted Minkowski metric parameterized by p:

$$\overline{D} = \left[\sum_{i=0}^{W-1} \sum_{j=0}^{H-1} \omega(i, j)(D(i, j))^p\right]^{\frac{1}{p}}$$

where $\omega(i, j)$ represents a non-negative weight. The lower the weight is, the more the pixel of coordinates (i,j) has to be considered as a pixel of perceptual interest. Advantageously, the perceptual relevancy is characterized by a saliency map associated to a given image. A saliency map is a two dimensional topographic representation of conspicuity of the source image. This map is normalized for example between 0 and 1. The saliency map is thus providing a saliency value s(i,j) per pixel (where (i,j) denotes the pixel coordinates) that characterizes its perceptual relevancy. The higher the s(i,j) value is, the more relevant the pixel of coordinates (i,j) is. A saliency map for a given image comprising at least one component (e.g. a luminance component) may be obtained with the method comprising the following steps:
  projection of said reference image according to the luminance component and if said image is a color image, according to the luminance component and according to the chrominance components;
  perceptual sub-bands decomposition of these components according to the visibility threshold of a human eye;
  extraction of the salient elements of the sub-bands related to the luminance component;

contour enhancement of the salient elements in each sub-band related to the luminance component;

calculation of a saliency map from the contour enhancement, for each sub-band related to the luminance component;

creation of the saliency map as a function of the saliency maps obtained for each sub-band.

This method is further described in the article by O. Le Meur et al. entitled "From low level perception to high level perception, a coherent approach for visual attention modeling" and published in the proceedings of SPIE Human Vision and Electronic Imaging IX (HVEI'04), San Jose, Calif., (B. Rogowitz, T. N. Pappas Ed.), Janvier 2004. The value (o(i,j) may be derived from the saliency value s(i,j) as follows: $\omega(i,j)=1-s(i,j)$ if s(i,j) lies in the range [0; 1]. s(i,j) may be estimated either on the reference or the distorted image.

Advantageously the image quality value assessed according to the invention can be used in the video compression domain. More generally, it can be used for any application instead of the commonly used PSNR ("Peak Signal to Noise Ratio") value. It gives a more accurate value of the image quality since it is more correlated with human judgement.

The invention claimed is:

1. A method for assessing image quality value of a distorted image with respect to a reference image, each image comprising pixels or image points, said method comprising the following steps:

detecting edges on said reference and distorted images to generate two edge images, an edge strength value being associated with each pixel of coordinates (i, j) in said reference image and an edge strength value being associated with each pixel of coordinates (i, j) in said distorted image;

thresholding said edge images to generate two edge maps, each map identifying edge pixels;

dividing the reference image into non-overlapping blocks;

estimating the level of texture for each block of said reference image by computing the number of edge pixels within each block and associate this value to each pixel within said block; and computing the masking capability of each pixel of coordinates (i, j) in said reference image based on the estimated levels of texture;

computing, for each pixel of said distorted image, at least one quality level with respect to said reference image, wherein said computing consists in one or more of the following steps:

computing a first quality level based on edge suppression level; or computing a second quality level based on edge apparition level; or computing a third quality level based on blocking effect level;

adding, for said distorted image, said quality levels associated with each of said pixels by weighting them by a weight depending on a perceptual interest of said pixel in order to get said image quality value, said weight being lower for a pixel of high perceptual interest.

2. A method according to claim 1, wherein the first quality level is computed for a pixel of coordinates (i, j) in said distorted image with the following formula:

$$Qsupp(i, j) = 2 \frac{edgeSrc(i, j) \times \text{MIN}[edgeSrc(i, j), \text{Mask}(i, j) \times edgeDeg(i, j)]}{edgeSrc(i, j)^2 + \text{MIN}[edgeSrc(i, j), \text{Mask}(i, j) \times edgeDeg(i, j)]^2}$$

wherein:

edgeSrc(i, j) is the edge strength value associated with the pixel of coordinates (i, j) in said reference image;

edgeDeg(i, j) is the edge strength value associated with the pixel of coordinates (i, j) in said distorted image;

Mask(i, j) is the masking capability of the pixel of coordinates (i, j) in said reference image; and MIN is the function that gives the minimum of two values.

3. A method according to claim 1, wherein the second quality level is computed for a pixel of coordinates (i, j) in said distorted image with the following formula:

$$Qadd(i, j) = 1 - \frac{\text{MAX}[edgeDeg(i, j) - edgeSrc(i, j), 0] \times \text{Mask}(i, j)}{edgeSrc(i, j)}$$

wherein:

edgeSrc(i,j) is the edge strength value associated with the pixel of coordinates (i, j) in said reference image;

edgeDeg(i, j) is the edge strength value associated with the pixel of coordinates (i, j) in said distorted image;

Mask(i, j) is the masking capability of the pixel of coordinates (i, j) in said reference image; and MAX is the function that gives the maximum of two values.

4. A method according to claim 1, wherein the third quality level is calculated for a pixel of said distorted image by the following steps:

dividing said reference and distorted images into non overlapping blocks defined by their spatial location, a block of said distorted image whose spatial location is the same as the spatial location of a block of said reference image being named corresponding block;

computing for each block in said images four gradient values based on four neighboring blocks;

subtracting from each gradient value associated with each block of said reference image the corresponding gradient value associated with said corresponding block of said distorted image, said subtracted values being associated with each block of said distorted image;

combining, for each block of said distorted image, said subtracted values to get a combined gradient value per block; and computing the third quality level for each block as an inverse function of said combined gradient value and assign said third quality level to each pixel within said block.

5. A method according to claim 1, wherein said weight associated with each pixel of said distorted image is derived from saliency maps.

6. A method according to claim 1, wherein the adding step uses the Minkowski metric.

* * * * *